(12) United States Patent
Shiozaki et al.

(10) Patent No.: US 8,234,945 B2
(45) Date of Patent: Aug. 7, 2012

(54) TRANSMISSION

(75) Inventors: Tomoo Shiozaki, Wako (JP); Yoshihisa Kanno, Wako (JP); Yoshiaki Tsukada, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 485 days.

(21) Appl. No.: 12/311,229

(22) PCT Filed: Aug. 23, 2007

(86) PCT No.: PCT/JP2007/066374
§ 371 (c)(1),
(2), (4) Date: Mar. 23, 2009

(87) PCT Pub. No.: WO2008/041430
PCT Pub. Date: Apr. 10, 2008

(65) Prior Publication Data
US 2009/0235782 A1    Sep. 24, 2009

(30) Foreign Application Priority Data

Sep. 29, 2006  (JP) ................................. 2006-270094

(51) Int. Cl.
*F16C 35/077*  (2006.01)
*F16H 3/30*    (2006.01)
(52) U.S. Cl. .............. 74/330; 384/542; 74/329; 74/333; 74/340; 74/359
(58) Field of Classification Search .................. 384/537, 384/542; 74/329, 330, 340
See application file for complete search history.

(56) References Cited

U.S. PATENT DOCUMENTS 4,302,984 A * 12/1981 Katayama ........................ 74/375
4,905,299 A *  2/1990 Ferraiuolo et al. ............ 384/585
(Continued)

FOREIGN PATENT DOCUMENTS

DE      103 49 841 A1    5/2005
(Continued)

OTHER PUBLICATIONS

Machine Translation of JP 2005265142 A by Google.*

*Primary Examiner* — David D Le
*Assistant Examiner* — Terry Chau
(74) *Attorney, Agent, or Firm* — Carrier Blackman & Associates, P.C.; William D. Blackman; Joseph P. Carrier

(57) ABSTRACT

A transmission is provided in which gear trains for multiple shift stages are provided between a countershaft and a first main shaft and second main shaft running coaxially and relatively rotatably through the first main shaft so that the gear trains can be alternatively established, wherein a plurality of odd number stage gear trains (G1, G3, G5) are provided between the second main shaft (27) and the countershaft (28) so that the first speed gear train (G1) is disposed on the opposite side to the first and second clutches (37, 38), an end part of the second main shaft (27) on the first speed gear train (G1) side is rotatably supported on an engine main body via a main shaft side ball bearing (31) having a larger diameter than an outer diameter of a first speed drive gear (89) provided integrally with the second main shaft (27), and an outer race (31a) of the main shaft side ball bearing (31) is fixed to the engine main body via a fixing plate (95) engaging with an outer peripheral part of the outer race (31a). This enables the transmission to be made compact in a direction along the axis of the first and second main shafts.

13 Claims, 8 Drawing Sheets

U.S. PATENT DOCUMENTS

| | | | |
|---|---|---|---|
| 6,021,880 A * | 2/2000 | Reed et al. | 192/219.3 |
| 6,505,973 B2 * | 1/2003 | Buchheim et al. | 384/537 |
| 7,001,293 B2 * | 2/2006 | Lubben | 474/8 |
| 7,303,495 B2 * | 12/2007 | Schoenek et al. | 474/144 |
| 7,305,900 B2 | 12/2007 | Suzuki et al. | |
| 7,387,042 B2 | 6/2008 | Suzuki et al. | |
| 2004/0069082 A1 * | 4/2004 | Koenig et al. | 74/335 |
| 2005/0204840 A1 * | 9/2005 | Soeda | 74/330 |
| 2005/0239592 A1 | 10/2005 | Schoenek et al. | |
| 2006/0005649 A1 * | 1/2006 | Baldascini et al. | 74/335 |
| 2006/0123939 A1 * | 6/2006 | Akutagawa | 74/329 |
| 2006/0210209 A1 * | 9/2006 | Fisk | 384/537 |
| 2007/0028709 A1 * | 2/2007 | Futamura et al. | 74/335 |

FOREIGN PATENT DOCUMENTS

| | | |
|---|---|---|
| EP | 1 526 304 A1 | 4/2005 |
| EP | 1 617 110 A1 | 1/2006 |
| FR | 2 883 061 A1 | 9/2006 |
| JP | 58-081264 A | 5/1983 |
| JP | 58-094669 A | 6/1983 |
| JP | 58-124862 A | 7/1983 |
| JP | 60-014322 U | 1/1985 |
| JP | 60-145618 U | 9/1985 |
| JP | 60-189616 U | 12/1985 |
| JP | 61-202754 U | 12/1986 |
| JP | 3-80655 | 8/1991 |
| JP | 8-320054 | 12/1996 |
| JP | 2003-32958 | 1/2003 |
| JP | 2005-265142 A | 9/2005 |
| JP | 2005-273829 A | 10/2005 |
| JP | 2006-71073 | 3/2006 |

* cited by examiner

TRANSMISSION

TECHNICAL FIELD

The present invention relates to a transmission in which a first clutch is provided between an internal combustion engine and one end part of a first main shaft, a second clutch is provided between the internal combustion engine and one end part of a second main shaft running coaxially and relatively rotatably through the first main shaft, and gear trains of multiple shift stages are provided between the first main shaft and a countershaft and between the second main shaft and the countershaft so that the gear trains can be alternatively established.

BACKGROUND ART

Such a transmission is already known from, for example, Patent Publication 1, etc. [Patent Publication 1] Japanese Patent Application Laid-open No. 8-320054

DISCLOSURE OF INVENTION

Problems to be Solved by the Invention

In the transmission disclosed by Patent Publication 1 above, a plurality of gear trains for odd number shift stages are provided between the first main shaft and the countershaft, and a plurality of gear trains for even number shift stages are provided between the second main shaft and the countershaft so that the second speed or fourth speed gear train is disposed on the opposite side to the first and second clutches. Because of this, when, in order to fix to an engine main body an outer race of a ball bearing for rotatably supporting on the engine main body an end part of the second main shaft on the opposite side to the first and second clutches, a fixing plate engaging with the outer periphery of the outer race is mounted on the engine main body, a portion of the fixing plate engaging with the outer race is disposed within an axial projection range of a drive gear provided on the second main shaft so as to form part of the second or fourth speed gear train; in order to avoid interference between the drive gear and the fixing plate, the drive gear is disposed at a position relatively distant from the engine main body in a direction along the axis of the second main shaft, and the transmission increases in size in the direction along the axis of the second main shaft.

The present invention has been accomplished in the light of the above-mentioned circumstances, and it is an object thereof to provide a transmission that can be made compact in a direction along the axis of first and second main shafts.

Means for Solving the Problems

In order to attain the above object, according to a first aspect of the present invention, there is provided a transmission in which a first clutch is provided between an internal combustion engine and one end part of a first main shaft, a second clutch is provided between the internal combustion engine and one end part of a second main shaft running coaxially and relatively rotatably through the first main shaft, and gear trains of multiple shift stages are provided between the first main shaft and a countershaft and between the second main shaft and the countershaft so that the gear trains can be alternatively established, characterized in that a plurality of the odd number stage gear trains are provided between the second main shaft and the countershaft so that the first speed gear train is disposed on the opposite side to the first and second clutches, an end part of the second main shaft on the opposite side to the first and second clutches is rotatably supported on an engine main body via a main shaft side ball bearing having a larger diameter than an outer diameter of a first speed drive gear provided integrally with the second main shaft so as to form part of the first speed gear train, an outer race of the main shaft side ball bearing is fixed to the engine main body via a fixing plate engaging with an outer peripheral part of the outer race, an end part of the countershaft on the opposite side to the first and second clutches is rotatably supported on the engine main body via a countershaft side ball bearing, outer races of the main shaft side ball bearing and the countershaft side ball bearing are fixed to the engine main body via the common fixing plate, and the common fixing plate is fixed to the engine main body by a bolt further outside than an outer diameter part of the first speed gear train.

According to a second aspect of the present invention, in addition to the first aspect, an annular recess is provided on an outer race of the countershaft side ball bearing, and outer races of the main shaft side ball bearing, and the fixing plate engages with the annular recess.

EFFECTS OF THE INVENTION

In accordance with the first aspect of the present invention, since the first speed drive gear, which has the smallest diameter among a series of drive gears provided on the second main shaft so as to form part of the gear trains for a plurality of shift stages, is provided integrally with an end part of the second main shaft on the opposite side to the first and second clutches, and the outer diameter of the main shaft side ball bearing, which is disposed between the second main shaft and the engine main body on the opposite side to the first and second clutches, is larger than the outer diameter of the first speed drive gear, it is possible to engage the fixing plate with an outer peripheral part of the outer race of the main shaft ball bearing while preventing the first speed drive gear from interfering with the fixing plate even when it is disposed in proximity to the engine main body, it is possible to dispose the first speed drive gear in proximity to the engine main body in a direction along the axis of the second main shaft, and it is possible to make the transmission compact in the direction along the axis of the second main shaft.

Furthermore, in accordance with the present invention, outer races of the main shaft side ball bearing and the countershaft side ball bearing are fixed to the engine main body by a single common fixing plate, thus reducing the number of components. In addition, since an annular recess is provided on an outer race of the countershaft side ball bearing, and the fixing plate engages with the annular recess, the fixing plate does not protrude inward from an inner end face of the countershaft side ball bearing.

EXPLANATION OF REFERENCE NUMERALS AND SYMBOLS

Figure 1:
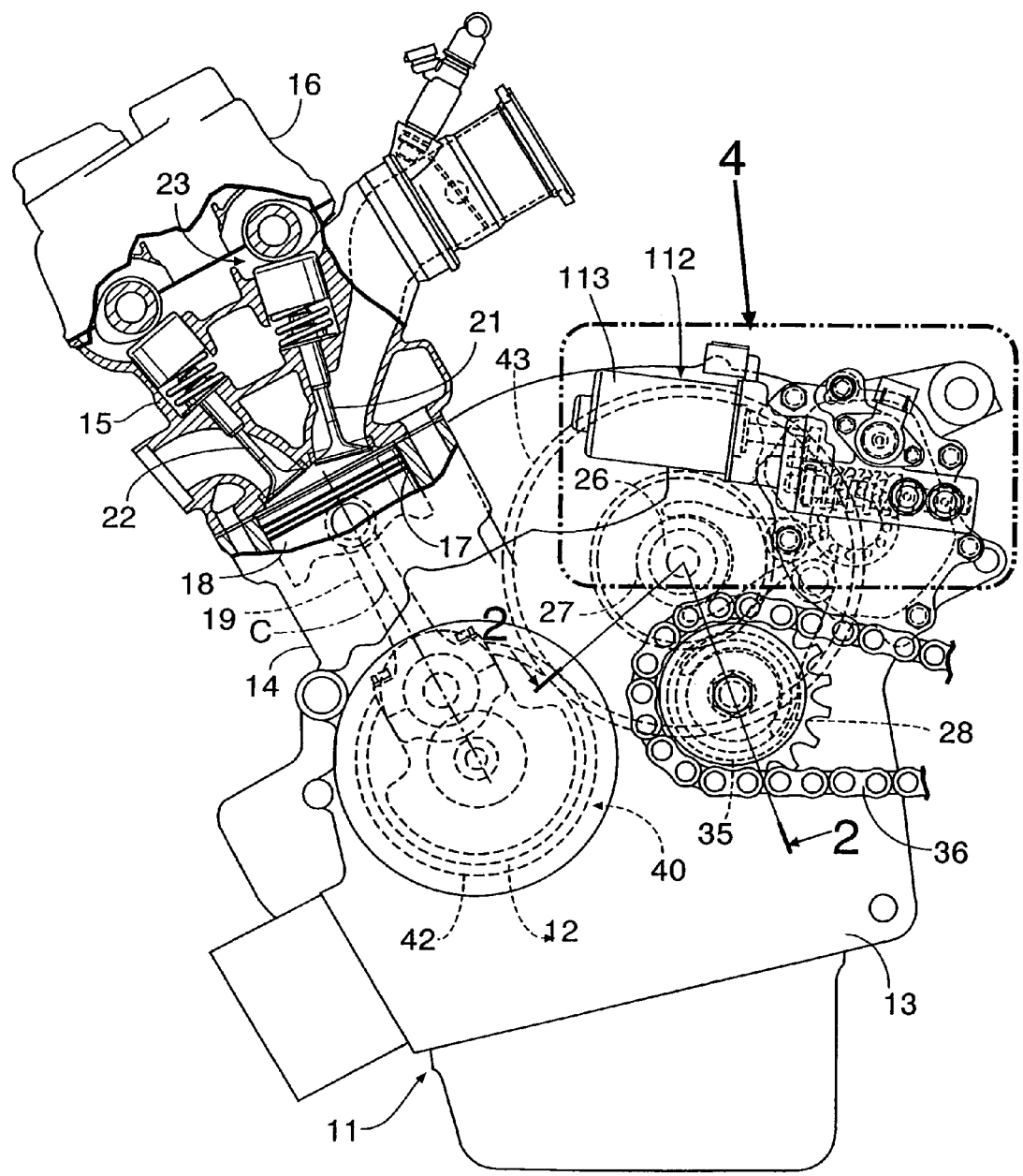
FIG. 1 is a partially cutaway side view of an internal combustion engine (first embodiment).

11 Engine main body
26 First main shaft
27 Second main shaft
31 Main shaft side ball bearing
31a, 33a Outer race
33 Countershaft side ball bearing
37 First clutch
38 Second clutch
89 First speed drive gear
95 Fixing plate
G1, G2, G3, G4, G5, G6 Gear train

BEST MODE FOR CARRYING OUT THE INVENTION

A mode for carrying out the present invention is explained below by reference to one embodiment of the present invention shown in the attached drawings.

Embodiment 1

FIG. 1 to FIG. 9 show one embodiment of the present invention.

First, in FIG. 1, this internal combustion engine is mounted in, for example, a motorcycle, and its engine main body 11 includes a crankcase 13 rotatably supporting a crankshaft 12 that runs along the left-and-right direction of the motorcycle, a cylinder block 14 joined to the crankcase 13 and having a cylinder bore 17 into which a piston 18 connected to the crankshaft 12 via a connecting rod 19 is slidably fitted, a cylinder head 15 joined to the cylinder block 14 so as to form a combustion chamber 20 between itself and the cylinder block 14, and a head cover 16 joined to the cylinder head 15, the top of the piston 18 facing the combustion chamber 20. An axis C of the cylinder bore 17 slopes up to the front when mounted in the motorcycle, and a valve operating system 23 for opening and closing an intake valve 21 and an exhaust valve 22 disposed in the cylinder head 15 so that they can open and close is housed between the cylinder head 15 and the head cover 16.

Figure 2:
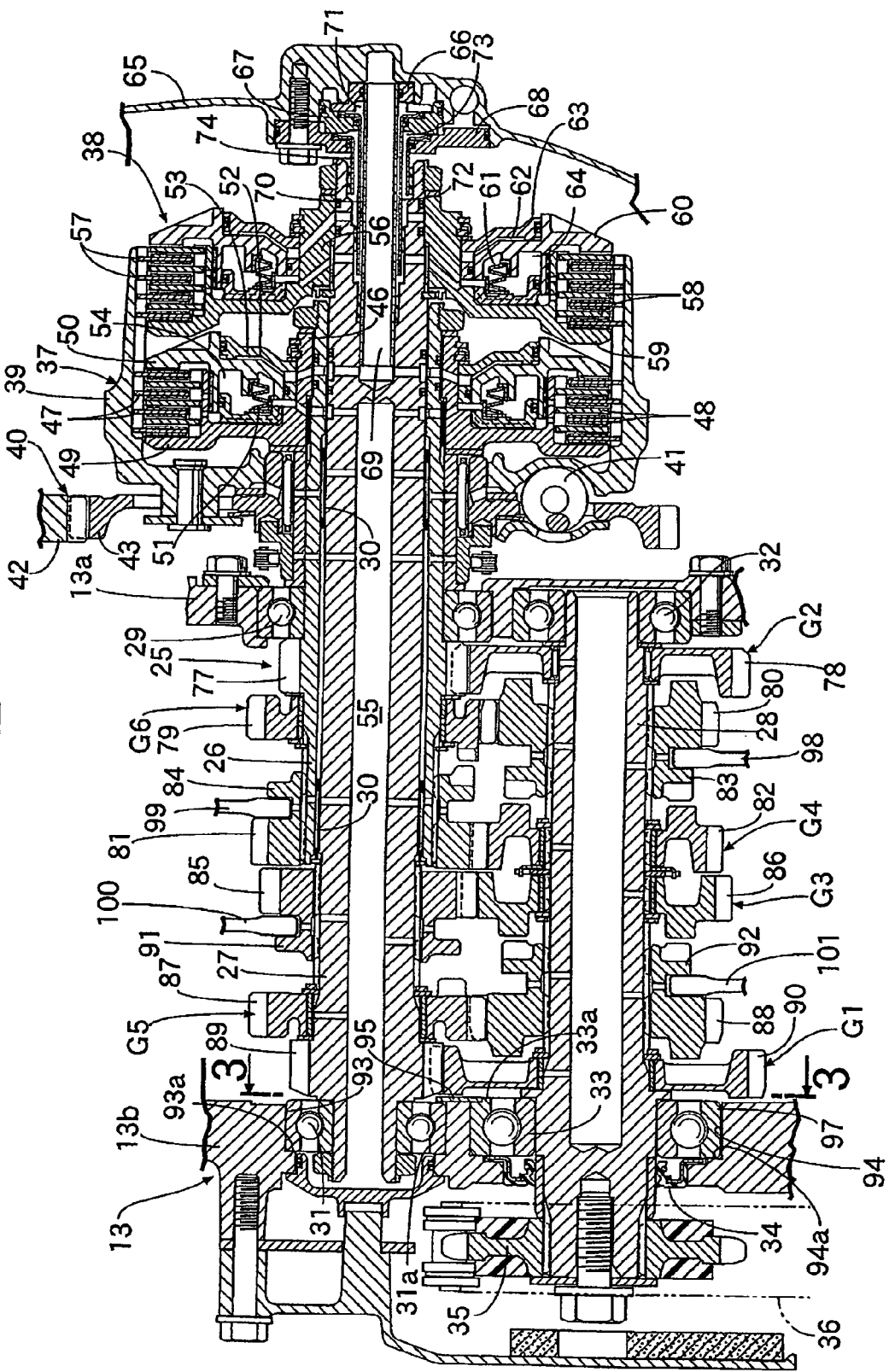
FIG. 2 is a sectional view along line 2-2 in FIG. 1. (first embodiment)

In FIG. 2, housed within the crankcase 13 are a gear shift mechanism 25 equipped with multiple shift stage gear trains that can be selectively established, for example, first to fourth speed gear trains G1, G2, G3, G4, G5, and G6, the gear shift mechanism 25 being formed by providing the second, fourth, and sixth speed gear trains G2, G4, and G6 between a first main shaft 26 and a countershaft 28 connected to a rear wheel, which is not illustrated, and providing the first, third, and fifth speed gear trains G1, G3, and G5 between the countershaft 28 and a second main shaft 27 running coaxially and relatively rotatably through the first main shaft 26.

The crankcase 13 includes a pair of side walls 13a and 13b facing each other across a gap in a direction along the axis of the crankshaft 12, and a middle section of the first main shaft 26, which is formed in a cylindrical shape having an axis parallel to the crankshaft 12, runs rotatably through the side wall 13a with a ball bearing 29 disposed between the side wall 13a and the first main shaft 26. Furthermore, the second main shaft 27, whose axis is parallel to the crankshaft 12, runs relatively rotatably through the first main shaft 26 while keeping its position in the axial direction relative to the first main shaft 26 constant, and a plurality of needle bearings 30 are disposed between the first main shaft 26 and the second main shaft 27. Furthermore, another end part of the second main shaft 27 is rotatably supported on the side wall 13b of the crankcase 13 via a main shaft side ball bearing 31.

One end part of the countershaft 28, which contains an axis parallel to the crankshaft 12, is rotatably supported on the side wall 13a via a ball bearing 32, the other end part of the countershaft 28 runs rotatably through the side wall 13b with a countershaft side ball bearing 33 and an annular seal member 34 disposed between itself and the side wall 13b, and a drive sprocket 35 is fixed to an end part of the countershaft 28 projecting from the side wall 13b so that a chain 36 for transmitting power to the rear wheel, which is not illustrated, is wrapped around the drive sprocket 35.

A first clutch 37 is provided between one end part of the first main shaft 26 and the crankshaft 12 of the internal combustion engine, and a second clutch 38 is provided between one end part of the second main shaft 27 and the crankshaft 12. Power from the crankshaft 12 is inputted into a clutch outer 39, which is common to the first and second clutches 37 and 38, via a primary reduction gear 40 and a damper spring 41. The primary reduction gear 40 is formed from a drive gear 42 provided on the crankshaft 12, and a driven gear 43 relatively rotatably supported on the first main shaft 26 and meshing with the drive gear 42, and the driven gear 43 is connected to the clutch outer 39 via the damper spring 41.

The first clutch 37 includes the clutch outer 39, a first clutch inner 46 coaxially surrounded by the clutch outer 39 and relatively non-rotatably connected to the first main shaft 26, a plurality of first friction plates 47 that relatively non-rotatably engage with the clutch outer 39, a plurality of second friction plates 48 that relatively non-rotatably engage with the first clutch inner 46 and are disposed alternately with the first friction plates 47, a first pressure-receiving plate 49 provided on the first clutch inner 46 so as to face the first and second friction plates 47 and 48, which are disposed so as to overlap each other, a first piston 50 sandwiching the first and second friction plates 47 and 48 between itself and the first pressure-receiving plate 49, and a first spring 51 that urges the first piston 50.

An end wall member 53 forming a first hydraulic chamber 52 between itself and the first piston 50 is fixedly disposed on the first clutch inner 46, a back face of the first piston 50 facing the first hydraulic chamber 52, and the first piston 50 operating so as to clamp the first and second friction plates 47 and 48 between itself and the first pressure-receiving plate 49 in response to an increase in hydraulic pressure of the first hydraulic chamber 52, thereby making the first clutch 37 attain a connected state in which power that has been transmitted from the crankshaft 12 to the clutch outer 39 is transmitted to the first main shaft 26. Furthermore, a canceller chamber 54 is formed between the first clutch inner 46 and the first piston 50, a front face of the first piston 50 facing the canceller chamber 54, and the first spring 51 being housed in the canceller chamber 54 so as to exhibit a spring force toward the side on which the volume of the first hydraulic chamber 52 decreases.

Moreover, the canceller chamber 54 communicates with a first oil passage 55 provided in, and coaxially with, the second main shaft 27 in order to supply lubricating oil between the first and second main shafts 26 and 27 and to lubrication sections of the gear reduction mechanism 26. Therefore, even if centrifugal force accompanying rotation acts on the oil of the first hydraulic chamber 52 in a reduced pressure state to thus generate a force that pushes the first piston 50, since centrifugal force also acts on the oil of the canceller chamber 54 in the same manner, the occurrence of a state in which the first piston 50 undesirably moves to the side on which the first and second friction plates 47 and 48 are held between itself and the first pressure-receiving plate 49 can be avoided.

The second clutch 38 is disposed side by side with the first clutch 37 so as to sandwich the first clutch 37 between itself and the primary reduction gear 40, and includes the clutch outer 39, a second clutch inner 56 surrounded coaxially by the clutch outer 39 and relatively non-rotatably joined to the second main shaft 27, a plurality of third friction plates 57 that relatively non-rotatably engage with the clutch outer 39, a plurality of fourth friction plates 58 that relatively non-rotatably engage with the second clutch inner 56 and are disposed alternately with the third friction plates 57, a second pressure-receiving plate 59 provided on the second clutch inner 56 so as to face the third and fourth friction plates 57 and 58, which are disposed so as to overlap each other, a second piston 60 sandwiching the third and fourth friction plates 57 and 58 between itself and the second pressure-receiving plate 59, and a second spring 61 urging the second piston 60.

An end wall member 63 forming a second hydraulic chamber 62 between itself and the second piston 60 is fixedly disposed on the second clutch inner 56, a back face of the second piston 60 facing the second hydraulic chamber 62, and the second piston 60 operating so as to clamp the third and fourth friction plates 57 and 58 between itself and the second pressure-receiving plate 59 in response to an increase in hydraulic pressure of the second hydraulic chamber 62, thereby making the second clutch 38 attain a connected state in which power that has been transmitted from the crankshaft 12 to the clutch outer 39 is transmitted to the second main shaft 27. Furthermore, a canceller chamber 64 is formed between the second clutch inner 56 and the second piston 60, a front face of the second piston 60 facing the canceller chamber 64, and the second spring 61 being housed in the canceller chamber 64 so as to exhibit a spring force toward the side on which the volume of the second hydraulic chamber 62 decreases.

The first and second clutches 37 and 38 are covered by a first cover 65 joined to the crankcase 13, and first, second, and third partition members 66, 67, and 68 are mounted on an inner face side of the first cover 65. A first tubular member 70 is provided between the second main shaft 27 and the first partition member 66, the first tubular member 70 forming a first hydraulic pressure supply route 69 communicating with the first hydraulic chamber 52 of the first clutch 37, a second tubular member 72 is provided between the second main shaft 27 and the second partition member 67, the second tubular member 72 coaxially surrounding the first tubular member 70 so as to form between itself and the first tubular member 70 an annular second oil passage 71 communicating with the canceller chamber 64 of the second clutch 38, and a third tubular member 74 is provided between the second main shaft 27 and the third partition member 68, the third tubular member 74 coaxially surrounding the second tubular member 72 so as to form between itself and the second tubular member 72 an annular second hydraulic pressure supply route 73 communicating with the second hydraulic chamber 62.

The first and second hydraulic pressure supply routes 69 and 73 are connected to a hydraulic pressure control system, which is not illustrated, and by controlling by means of the hydraulic pressure control system the hydraulic pressure of the first and second hydraulic pressure supply routes 69 and 73, that is, the first and second hydraulic chambers 52 and 62, switching between connection and disconnection of the first and second clutches 37 and 38 is controlled.

The fourth speed gear train G4, the sixth speed gear train G6, and the second speed gear train G2 are provided between the first main shaft 26 and the countershaft 28 so as to be arranged in sequence from the opposite side to the first and second clutches 37 and 38. The second speed gear train G2 is formed from a second speed drive gear 77 that is provided integrally with the first main shaft 26, and a second speed driven gear 78 that is relatively rotatably supported on the countershaft 28 and meshes with the second speed drive gear 77, the sixth speed gear train G6 is formed from a sixth speed drive gear 79 that is relatively rotatably supported on the first main shaft 26, and a sixth speed driven gear 80 that is relatively non-rotatably supported on the countershaft 28 while being capable of moving in the axial direction and that meshes with the sixth speed drive gear 79, and the fourth speed gear train G4 is formed from a fourth speed drive gear 81 that is relatively non-rotatably supported on the first main shaft 26 while being capable of moving in the axial direction, and a fourth speed driven gear 82 that is relatively rotatably supported on the countershaft 28 and meshes with the fourth speed drive gear 81.

A first shifter 83 is relatively non-rotatably and axially movably supported on the countershaft 28 between the second speed driven gear 78 and the fourth speed driven gear 82, the first shifter 83 being capable of switching between a state in which it engages with the second speed driven gear 78, a state in which it engages with the fourth speed driven gear 82, and a state in which it does not engage with either the second speed driven gear 78 or the fourth speed driven gear 8, and the sixth speed driven gear 80 being integrally provided with the first shifter 83. Furthermore, the fourth speed drive gear 80 is provided integrally with a second shifter 84 relatively non-rotatably and axially movably supported on the first main shaft 26, and the second shifter 84 is capable of switching between engagement with and disengagement from the sixth speed drive gear 79.

Engaging the first shifter 83 with the second speed driven gear 78 in a state in which the second shifter 84 is not engaged with the sixth speed drive gear 79 establishes the second speed gear train G2, engaging the first shifter 83 with the fourth speed driven gear 82 in a state in which the second shifter 84 is not engaged with the sixth speed drive gear 79 establishes the fourth speed gear train G4, and engaging the second shifter 84 with the sixth speed drive gear 79 when the first shifter 83 is in a neutral state establishes the sixth speed gear train G6.

The first speed gear train G1, the fifth speed gear train G5, and the third speed gear train G3 are provided so as to be arranged in order from the opposite side to the first and second clutches 37 and 38 between the countershaft 28 and a portion of the second main shaft 27 projecting from the other end part of the first main shaft 26. The third speed gear train G3 is formed from a third speed drive gear 85 that is relatively non-rotatably supported on the second main shaft 27 while being capable of moving in the axial direction, and a third speed driven gear 86 that is relatively rotatably supported on the countershaft 28 and meshes with the third speed drive gear 85, the fifth speed gear train G5 is formed from a third speed drive gear 87 that is relatively rotatably supported on the second main shaft 27, and a third speed driven gear 88 that is relatively non-rotatably supported on the countershaft 28 while being capable of moving in the axial direction and that meshes with the third speed drive gear 87, and the first speed gear train G1 is formed from a first speed drive gear 89 that is provided integrally with the second main shaft 27, and a first speed driven gear 90 that is relatively rotatably supported on the countershaft 28 and meshes with the first speed drive gear 89.

The third speed drive gear 85 is provided integrally with a third shifter 91 that is relatively non-rotatably and axially movably supported on the second main shaft 27, and the third shifter 91 is capable of switching between engagement with and disengagement from the fifth speed drive gear 87. A fourth shifter 92 is relatively non-rotatably and axially movably supported on the countershaft 28 between the third speed driven gear 86 and the first speed driven gear 90, the fourth shifter 92 being capable of switching between a state in which it engages with the third speed driven gear 86, a state in which it engages with the first speed driven gear 90, and a neutral state in which it does not engage with either the third speed driven gear 86 or the first speed driven gear 90, and the fifth speed driven gear 88 being provided integrally with the fourth shifter 92.

Engaging the fourth shifter 92 with the first speed driven gear 90 in a state in which the third shifter 91 is not engaged with the fifth speed drive gear 87 establishes the first speed gear train G1, engaging the fourth shifter 92 with the third speed driven gear 86 in a state in which the third shifter 91 is not engaged with the fifth speed drive gear 87 establishes the third speed gear train G3, and engaging the third shifter 91 with the fifth speed drive gear 87 when the fourth shifter 92 is in a neutral state establishes the fifth speed gear train G5.

Figure 3:
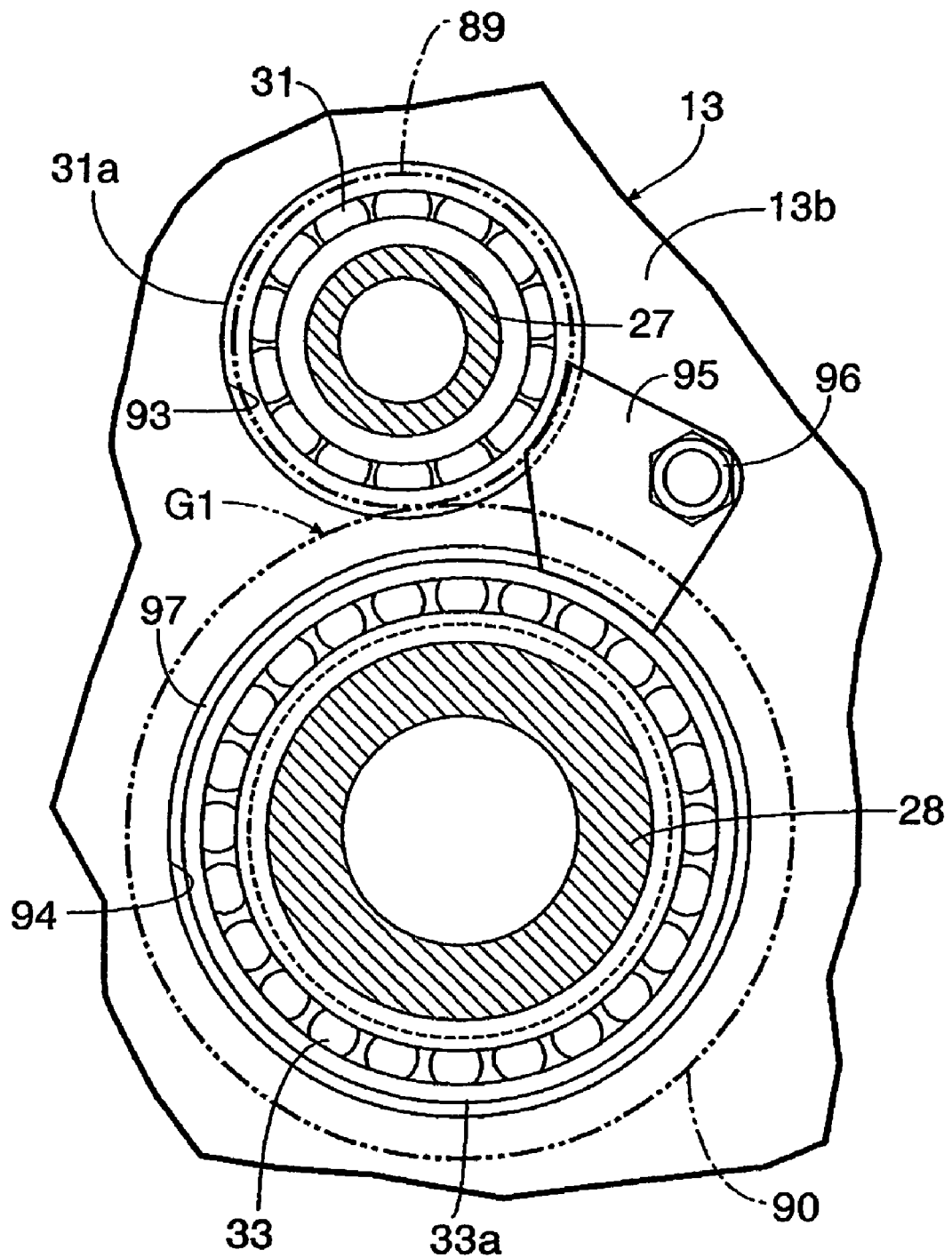
FIG. 3 is a sectional view along line 3-3 in FIG. 2. (first embodiment)

Referring in addition to FIG. 3, an end part of the second main shaft 27 on the opposite side to the first and second clutches 37 and 38 is rotatably supported on the side wall 13b of the crankcase 13 of the engine main body 11 via the main shaft side ball bearing 31, and an outer race 31a of the main shaft side ball bearing 31 is fitted into a support hole 93 provided in the side wall 13b from the inside of the crankcase 13. Moreover, the inner diameter of the support hole 93 and the outer diameter of the outer race 31a are set so as to be larger than the outer diameter of the first speed drive gear 89 provided integrally with the second main shaft 27 so as to form part of the first speed gear train G1.

Moreover, the outer race 31a of the main shaft side ball bearing 31 is held between a step 93a provided on the support hole 93, and a fixing plate 95 fixed to an inner face of the side wall 13b by a bolt 96 and engaging with an outer peripheral part of the outer race 31a.

On the other hand, an end part of the countershaft 28 on the opposite side to the first and second clutches 37 and 38 is rotatably supported on the side wall 13b via the countershaft side ball bearing 33, and an outer race 33a of the countershaft side ball bearing 33 is fitted into a support hole 94 provided in the side wall 13b so that the outer race 33a abuts against a step 94a provided on the support hole 94. The fixing plate 95 also engages with an outer peripheral part of the outer race 33a of the countershaft side ball bearing 33, and the main shaft side ball bearing 31 and the countershaft side ball bearing 33 are fixed to the side wall 13b of the crankcase 13 by the fixing plate 95, which is common to the outer races 31a and 33a.

Moreover, part of the countershaft side ball bearing 33 projects slightly from an inner face of the side wall 13b, the fixing plate 95 engages with an annular recess 97 provided on the outer periphery of a portion of the countershaft side ball bearing 33 projecting from the side wall 13b, and the fixing plate 95 does not protrude inward from an inner end face of the countershaft side ball bearing 33.

The first to fourth shifters 83, 84, 91, and 92 are rotatably retained by first to fourth shift forks 98, 99, 99, and 101, and by driving these shift forks 98 to 101 in the axial direction of the two main shafts 26 and 27 and the countershaft 28 the first to fourth shifters 83, 84, 91, and 92 move in the axial direction.

Figure 4:
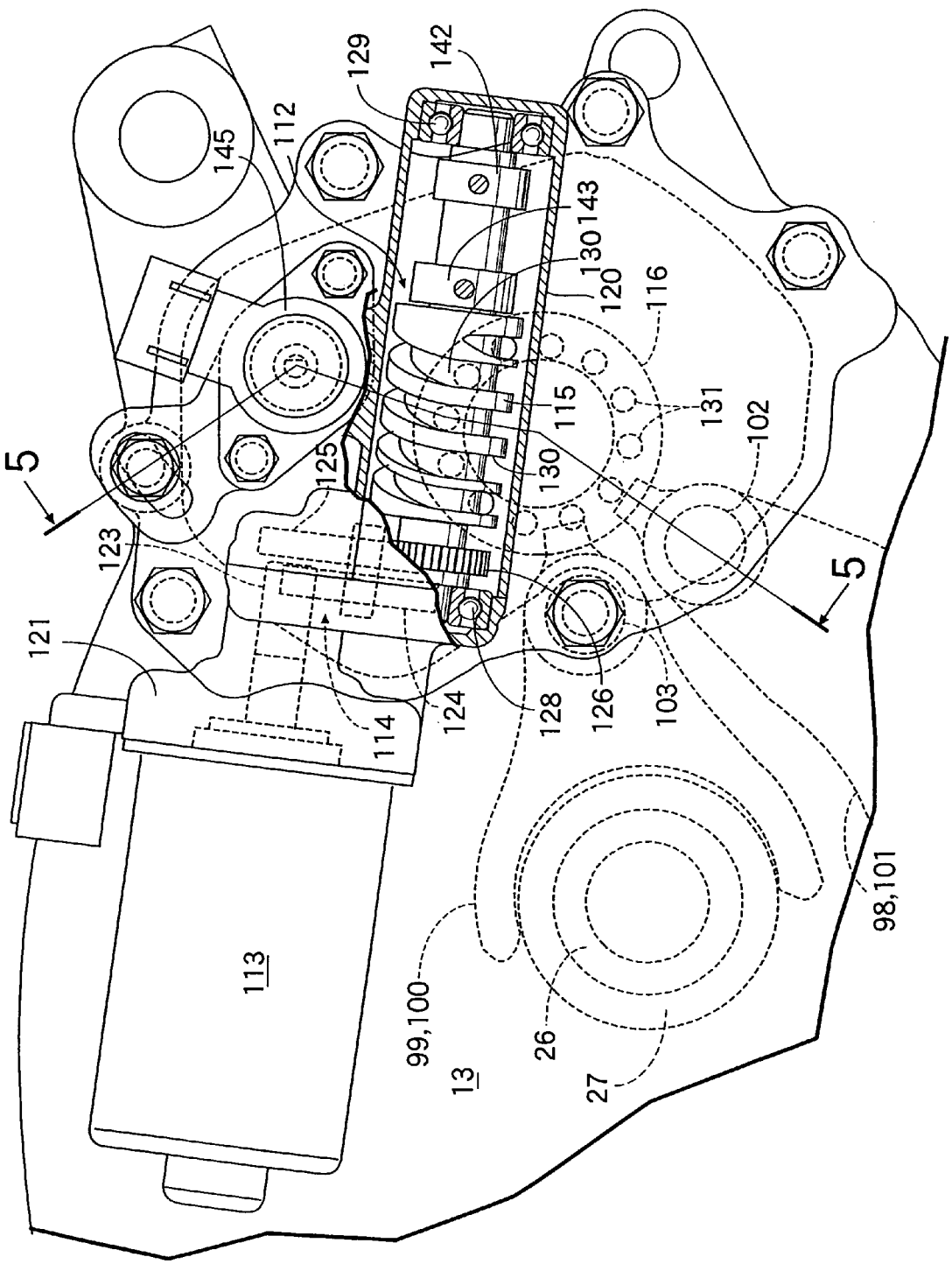
FIG. 4 is a partially cutaway enlarged view of part shown by arrow 4 in FIG. 1. (first embodiment)
Figure 5:
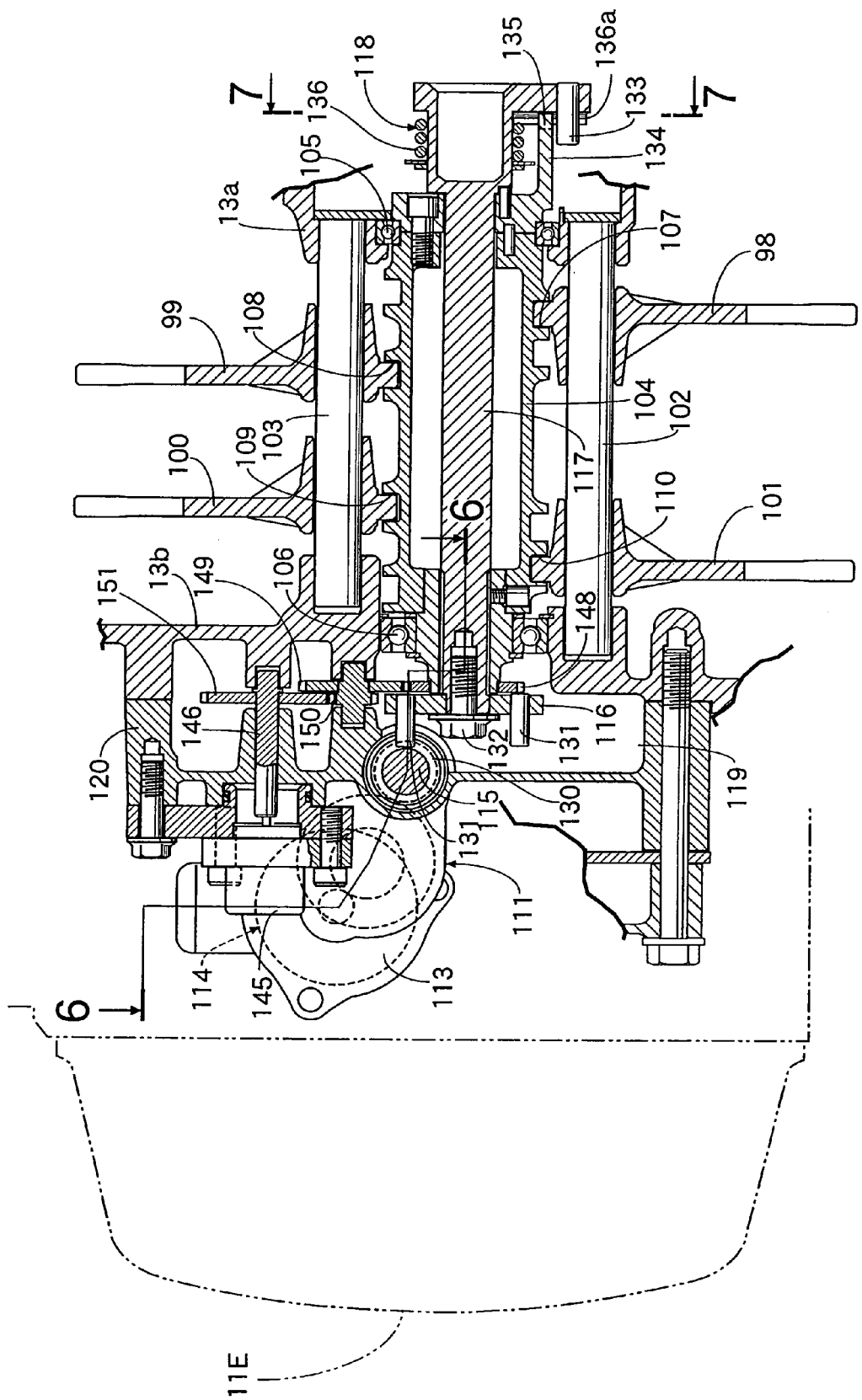
FIG. 5 is a sectional view along line 5-5 in FIG. 4. (first embodiment)

In FIG. 4 and FIG. 5, the first and fourth shift forks 98 and 101 retaining the first and fourth shifters 83 and 92 are slidably supported on a first shift shaft 102 having an axis parallel to the axes of the two main shafts 26 and 27 and the countershaft 28 and having opposite ends supported on the two side walls 13a and 13b of the crankcase 13, and the second and third shift forks 99 and 100 retaining the second and third shifters 84 and 91 are slidably supported by a second shift shaft 103 having an axis parallel to the first shift shaft 102 and having opposite ends supported on the two side walls 13a and 13b.

A shift drum 104 containing an axis parallel to the axis of the crankshaft 12, that is, an axis along the left-and-right direction of the motorcycle, is rotatably supported on the two side walls 13a and 13b via ball bearings 105 and 106, and pins 98a, 99a, 100a, and 101a provided on the shift forks 98 to 101 respectively are slidably engaged with first to fourth lead grooves 107, 108, 109, and 110 provided in the outer periphery of the shift drum 104; when the shift drum 104 pivots, each of the shift forks 98 to 101 slides according to the shape of the first to fourth lead grooves 107 to 111.

Figure 6:
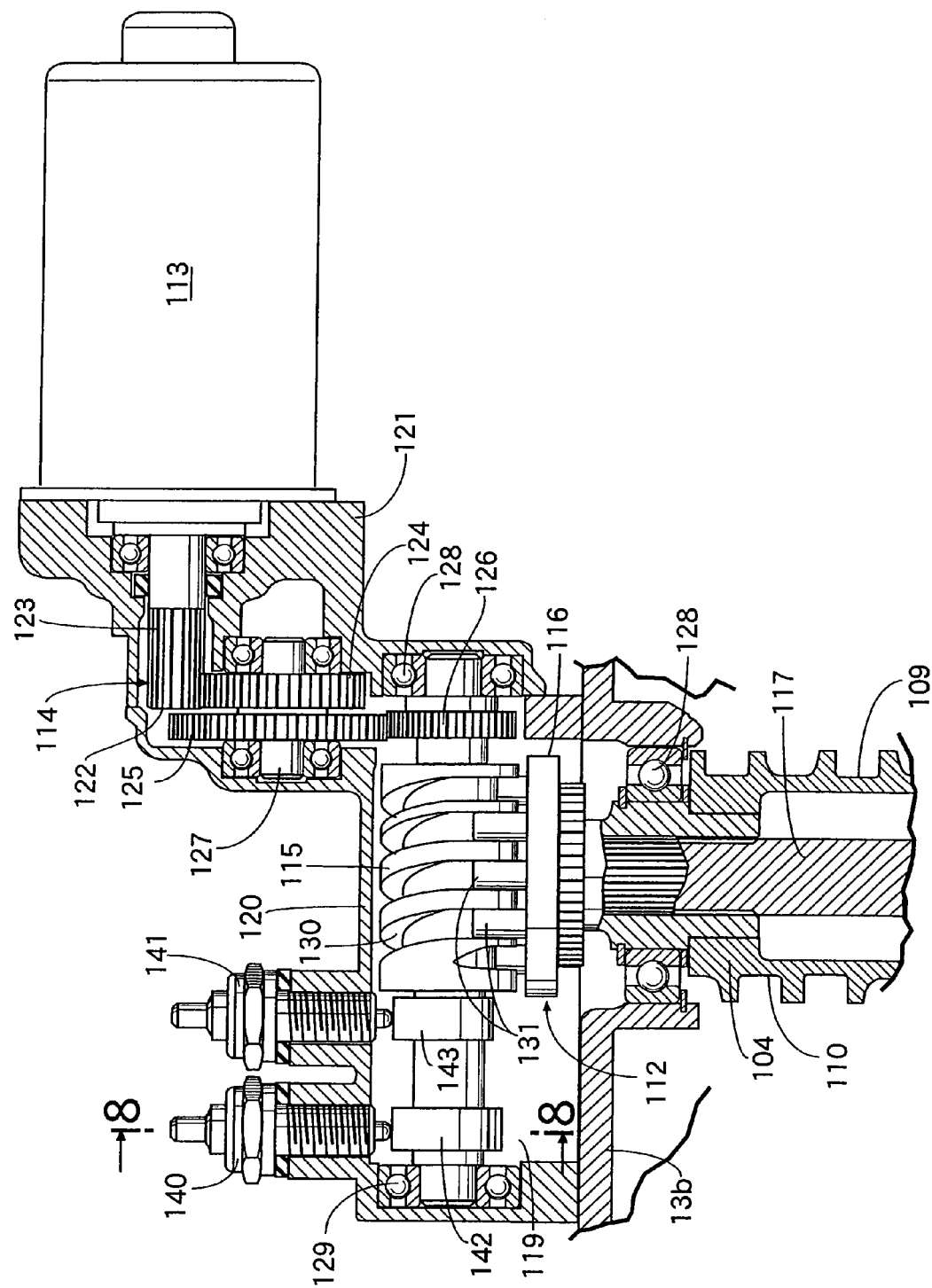
FIG. 6 is a sectional view along line 6-6 in FIG. 5. (first embodiment)

Referring in addition to FIG. 6, the shift drum 104 is pivoted by drive means 112, and this drive means 112 includes an electric motor 113 that is disposed on one side along the axial direction of the shift drum 104, in this embodiment the opposite side to the side on which the first and second clutches 37 and 38 are disposed, and that has a rotational axis in a plane perpendicular to the axis of the shift drum 104; power exerted by the electric motor 113 is transmitted to the other end, in the axial direction, of the shift drum 104 via a reduction gear mechanism 114, a barrel cam 115, a disk-shaped rotation transmission member 116, a transmission shaft 117, and a lost motion mechanism 118, in this embodiment the side of the shift drum 104 on which the first and second drive means 37 and 38 are disposed.

A case member 120 forming between itself and the side wall 13b an operation chamber 119 housing the reduction gear mechanism 114, the barrel cam 115, and the rotation transmission member 116 is secured to an outer face of the side wall 13b of the crankcase 13, and the electric motor 113 is mounted on a cover member 121 mounted on the case member 120 so as to block an open end of the case member 120, such that the motor shaft 122 projects into the operation chamber 119.

The gear reduction mechanism 114 is formed from a drive pinion 123 provided on a motor shaft 122 of the electric motor 113, a first intermediate gear 124 meshing with the drive pinion 123, a second intermediate gear 125 rotating together with the first intermediate gear 124, and a driven gear 126 provided on the barrel cam 115 and meshing with the second intermediate gear 125.

The first and second intermediate gears 124 and 125 are provided on a rotating shaft 127 having opposite end parts rotatably supported by the case member 120 and the cover member 121, and opposite end parts of the barrel cam 115 are rotatably supported on the case member 120 and the cover member 121 via ball bearings 128 and 129.

A helical cam groove 130 is provided on the outer periphery of the barrel cam 115. The rotation transmission member 116 is disposed so as to face the outer periphery of the barrel cam 115 so that it can rotate around the same axis as the shift drum 104, and a plurality of engagement pins 131 are provided at equal intervals in the circumferential direction on the rotation transmission member 116 so that they can selectively engage with the cam groove 130. The plurality of engagement pins 131 engage with the cam groove 130 in sequence in response to rotation of the barrel cam 115 and are fed, thereby transmitting rotational power to the rotation transmission member 116.

One end part of the transmission shaft 117, which runs coaxially and relatively rotatably through the shift drum 104, is coaxially and relatively non-rotatably joined to the rotation transmission member 116 via a bolt 132, and the lost motion mechanism 118 is provided between the other end part of the transmission shaft 117 and the other end part of the shift drum 104.

Figure 7:
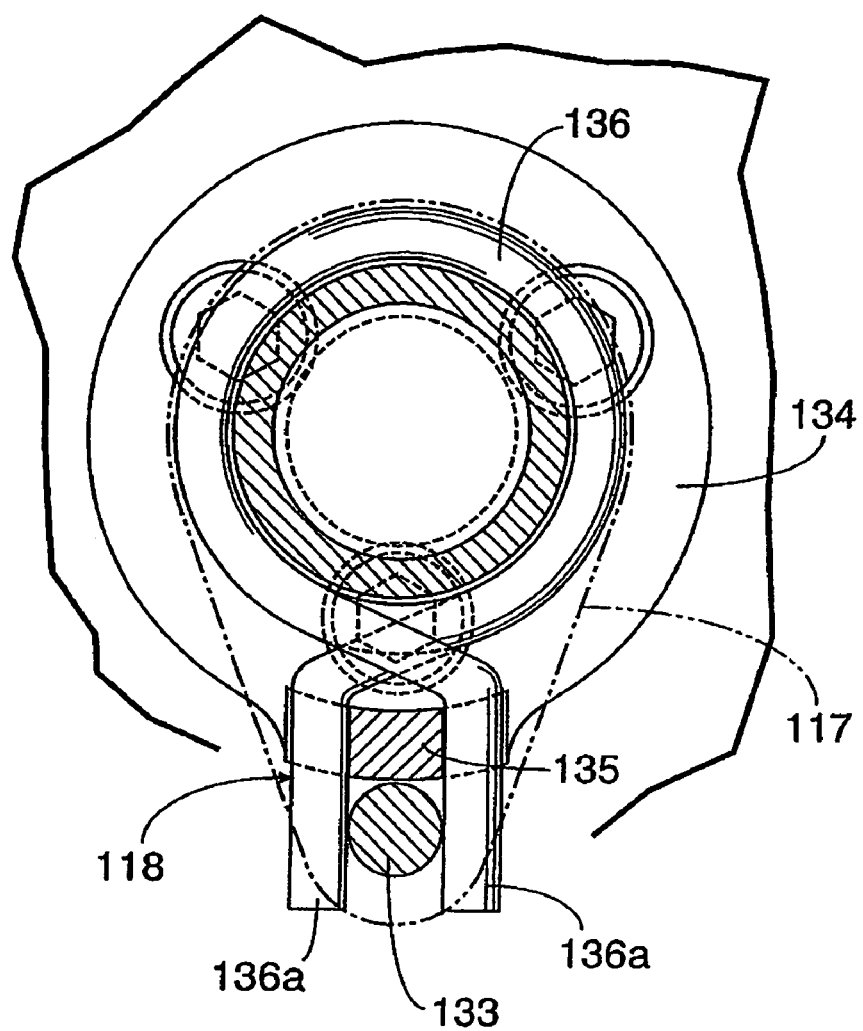
FIG. 7 is an enlarged sectional view along line 7-7 in FIG. 5. (first embodiment)

In FIG. 7, the lost motion mechanism 118 includes a pin 133 that is provided on the other end side of the transmission shaft 117 so as to be offset from the rotational axis thereof, a transmission member 134 that is secured to the other end of the shift drum 104 and is provided with a transmission projection 135 disposed inward of the pin 133 so as to be offset from the axis of the shift drum 104, and a clamping spring 136 that has a pair of clamping pieces 136a and 136a at opposite ends and is attached to the transmission shaft 117, the pin 133 and the transmission projection 135 being disposed between the two clamping pieces 136a and 136a.

When the pin 133 pushes one of the two clamping pieces 136a in a pivoting direction in response to pivoting of the transmission shaft 117, the other clamping piece 136a pushes the transmission projection 135, and a pivoting force due to pivoting of the transmission shaft 117 is transmitted to the shift drum 104 via the lost motion mechanism 118, which generates play.

Figure 8:
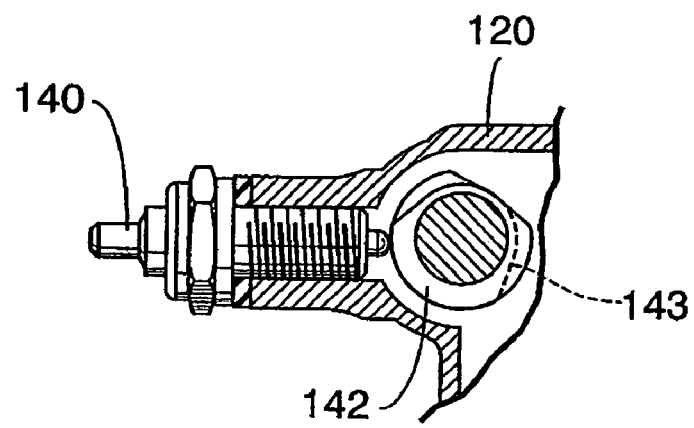
FIG. 8 is a sectional view along line 8-8 in FIG. 6. (first embodiment)

The drive means 112 is arranged so as to pivot the shift drum 104 so that the shift stage changes by only one stage per rotation of the barrel cam 115, and in order to confirm that the barrel cam 115 rotates correctly in response to operation of the electric motor 113, first and second switches 140 and 141 are mounted on the case member 120. As shown in FIG. 8, a first switch cam 142 is provided in a portion, corresponding to the first switch 140, of the barrel cam 115, the first switch cam 142 abutting against the first switch 140 so as to put the first switch 140 in an ON state, and a second switch cam 143 is provided in a portion, corresponding to the second switch 141, of the barrel cam 115, the second switch cam 143 abutting against the second switch 141 so as to put the second switch 141 in an ON state, the first and second switch cams 142 and 143 having an identical shape and being provided on the barrel cam 115 at different phases.

Figure 9:
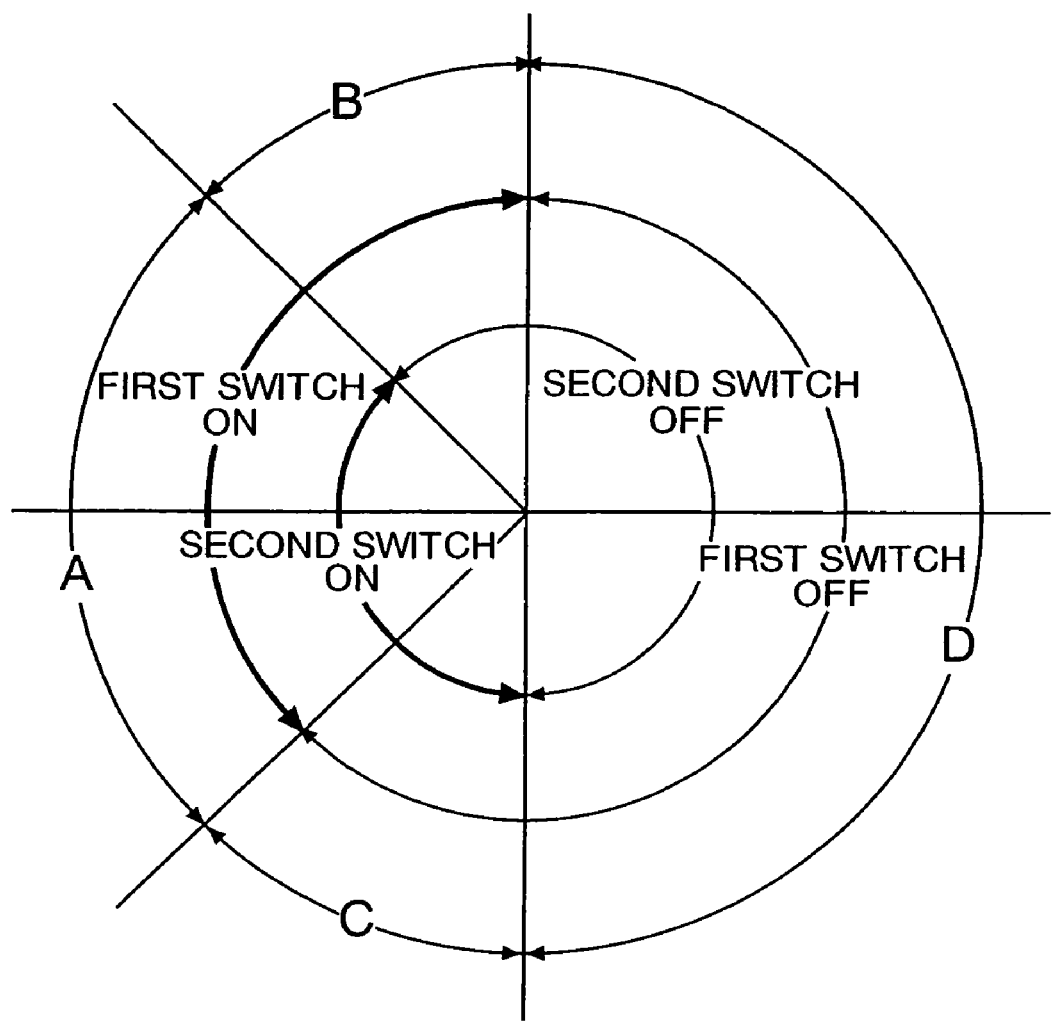
FIG. 9 is a view showing changes of ON/OFF states of first and second switches. (first embodiment)

The ON/OFF states of the first and second switches 140 and 141 change in response to rotation of the barrel cam 115 as shown in FIG. 9; rotation of the barrel cam 115 defines a region A in which the two switches 140 and 141 attain the ON state, a region B in which the first switch 140 attains the ON state and the second switch 141 attains the OFF state, a region C in which the second switch 141 attains the ON state and the first switch 140 attains the OFF state, and a region D in which the two switches 140 and 141 attain the OFF state, and by detecting the ON/OFF states of the first and second switches 140 and 141 the operating status of the barrel cam 115 can be confirmed.

Furthermore, a shift sensor 145 for detecting the pivot position of the shift drum 104 is mounted on the case member 120, and a detection shaft 146 of the shift sensor 145 is rotatably supported by the side plate 13b of the crankcase 13 and the case member 120.

A third intermediate gear 149 meshes with a drive gear 148 rotating together with the shift drum 104, and a driven gear 151 provided on the detection shaft 145 meshes with a fourth intermediate gear 150 rotating together with the third intermediate gear 149.

Such drive means 112 is disposed on the crankcase 13 of the engine main body 11 further inward than the outermost position (portion shown by dotted-dashed line 11E in FIG. 5) of the engine main body 11 in a direction along the axis of the shift drum 104.

The operation of this embodiment is now explained. The drive means 112 pivoting the shift drum 104 includes the electric motor 113 disposed at one end, in the axial direction, of the shift drum 104, and the transmission shaft 117 to which is transmitted power from the electric motor 113 at the one end, in the axial direction, of the shift drum 104; moreover, the transmission shaft 117 runs coaxially and relatively rotatably through the shift drum 104 and, furthermore, an index mechanism formed from the barrel cam 115 and the rotation transmission member 116 and the lost motion mechanism 118 are divided and provided on opposite sides along the axial direction of the shift drum 104. It is therefore possible to make the drive means 112 compact and to avoid a concentrated disposition of the drive means 112 on one side, in the axial direction, of the shift drum 104, thus making the internal combustion engine compact.

Furthermore, since the drive means 112 includes the electric motor 113 disposed so as to have its rotational axis in the plane perpendicular to the axis of the shift drum 104, the barrel cam 115 rotating around the axis parallel to the electric motor 113 as a result of transmission of power from the electric motor 113 and having the cam groove 130 on the outer periphery, and the rotation transmission member 116 operatively connected to the shift drum 104 so as to be capable of rotating around the axis perpendicular to the rotational axis of the barrel cam 115 and provided with the plurality of engagement pins 131 that can selectively engage with the cam groove 130, the power of the electric motor 113 is transmitted to the shift drum 104 side via the barrel cam 115 and the rotation transmission member 116, and it is therefore possible to suppress the amount of the electric motor 113 protruding from the engine main body 11 in a direction along the axis of the shift drum 104, make the drive means 112 compact by disposing the shift drum 104 and the electric motor 113 in proximity to each other, and improve the shift precision.

Moreover, since the axis of the shift drum 104 runs along the left-and-right direction of the motorcycle, it is possible to suppress protrusion of the motorcycle in the width direction and set a relatively large bank angle.

Furthermore, since the drive means 112 is disposed on the engine main body 11 further inward than the outermost position (portion shown by dotted-dashed line 11E in FIG. 5) of the engine main body 11 in a direction along the axis of the shift drum 104, even if the motorcycle falls over, the drive means 112 can be protected by the engine main body 11.

Furthermore, the plurality of gear trains G1, G3, and G5 for odd number stages are provided by disposing the first speed gear train G1 on the opposite side to the first and second clutches 37 and 38 between the countershaft 28 and the second main shaft 27 running coaxially and relatively rotatably through the first main shaft 26, an end part of the second main shaft 27 on the opposite side to the first and second clutches 37 and 38 is rotatably supported on the side wall 13b of the crankcase 13 of the engine main body 11 via the main shaft side ball bearing 31 having a larger diameter than the outer diameter of the first speed drive gear 89, and the outer race 31a of the main shaft side ball bearing 31 is fixed to the side wall 13b by the fixing plate 95 engaging with the outer peripheral part of the outer race 31a.

It is therefore possible to engage the fixing plate 95 with the outer race 31a of the main shaft side ball bearing 31 while preventing the first speed drive gear 89 from interfering with the fixing plate 95 even if it is disposed in proximity to the side wall 13b, it is possible to dispose the first speed drive gear 89 in proximity to the side wall 13b in a direction along the axis of the second main shaft 27, and it is possible to make a transmission device compact in the direction along the axis of the second main shaft 27.

Moreover, since the outer race 33a of the countershaft side ball bearing 33 rotatably supporting on the side wall 13b an end part the countershaft 28 on the opposite side to the first and second clutches 37 and 38 is also fixed to the side wall 13b by the fixing plate 95, the outer races 31a and 33a of the main shaft side ball bearing 31 and the countershaft side ball bearing 33 are fixed to the side wall 13b via the single common fixing plate 95, thus reducing the number of components.

An embodiment of the present invention is explained above, but the present invention is not limited to the above-mentioned embodiment and may be modified in a variety of ways as long as the modifications do not depart from the spirit and scope thereof.

The invention claimed is:

1. A transmission in which
a first clutch is provided between an internal combustion engine and one end part of a first main shaft, a second clutch is provided between the internal combustion engine and one end part of a second main shaft running coaxially and relatively rotatably through the first main shaft, and
gear trains of multiple shift stages are provided between the first main shaft and a countershaft and between the second main shaft and the countershaft so that the gear trains can be alternatively established,
wherein:
a plurality of odd number stage gear trains are provided between the second main shaft and the countershaft and arranged so that a first speed gear train is disposed on the opposite side to the first and second clutches,
an end part of the second main shaft on the opposite side to the first and second clutches is rotatably supported on an engine main body via a main shaft side ball bearing having a larger diameter than an outer diameter of a first speed drive gear provided integrally with the second main shaft so as to form part of the first speed gear train, and an outer race of the main shaft side ball bearing is fixed to the engine main body via a fixing plate engaging with an outer peripheral part of the outer race,
an end part of the countershaft on the opposite side to the first and second clutches is rotatably supported on the engine main body via a countershaft side ball bearing, and an outer race of the countershaft side ball bearing is also fixed to the engine main body via said fixing plate, and the fixing plate is configured and dimensioned to cover less than half of the circumference of each of the respective outer races, and is fixed to the engine main body by a bolt which is disposed further from an axis of the countershaft than an outer diameter part of a first speed driven gear which is mounted on the countershaft,
an annular recess is provided on the outer race of the countershaft side ball bearing, the fixing plate engages with the annular recess, and the fixing plate has two arcuate ends formed therein to conform to the respective shapes of the ball bearing races engaged thereby.

2. The transmission according to claim 1, wherein:
part of the countershaft side ball bearing projects slightly from an inner face of a side wall of a crankcase, and
the fixing plate engages with the annular recess provided on an outer periphery of a portion of the countershaft side ball bearing projecting from the side wall.

3. The transmission according to claim 1, wherein the fixing plate is fixed to the engine main body by a single bolt.

4. The transmission according to claim 1, wherein the transmission is configured for use on a motorcycle, and comprises a drive sprocket affixed to the countershaft for rotatably driving a chain.

5. The transmission according to claim 1, wherein the transmission is disposed inside of a crankcase having a side wall with a support hole formed therein, and the outer race of the main shaft side ball bearing is fitted into said support hole provided in the side wall of the crankcase.

6. The transmission according to claim 5, wherein a step is formed in the side wall of the crankcase at the bottom of said support hole, and wherein the outer race of the main shaft side ball bearing is held between said step and the fixing plate fixed to an inner face of the side wall by a single bolt engaging with an outer peripheral part of the outer race.

7. The transmission according to claim 1, wherein the transmission further comprises a shift drum and a drive mechanism for selectively rotating the shift drum, said drive mechanism comprising:
an electric motor having a rotational axis in a plane perpendicular to an axis of the shift drum,
a reduction gear mechanism driven by said electric motor,
a barrel cam operatively connected to said reduction gear mechanism,
a disk-shaped rotation transmission member,
and a shaft extending between said rotation transmission member and said shift drum.

8. A motorcycle transmission, in which:
a first clutch is provided between an internal combustion engine and one end part of a first main shaft,
a second clutch is provided between the internal combustion engine and one end part of a second main shaft running coaxially and relatively rotatably through the first main shaft,
and gear trains of multiple shift stages are provided between the first main shaft and a countershaft and between the second main shaft and the countershaft so that the gear trains can be alternatively established,
wherein a plurality of odd number stage gear trains are provided between the second main shaft and the countershaft and arranged so that a first speed gear train is disposed on a side opposite to the first and second clutches, the counter shaft having a drive sprocket affixed thereto for rotatably driving a chain,
an end part of the second main shaft on the opposite side to the first and second clutches is rotatably supported on an engine main body via a main shaft side ball bearing having a larger diameter than an outer diameter of a first speed drive gear provided integrally with the second main shaft so as to form part of the first speed gear train, and an outer race of the main shaft side ball bearing is fixed to the engine main body via a fixing plate engaging with an outer peripheral part of the outer race,
an end part of the countershaft on the opposite side to the first and second clutches is rotatably supported on the engine main body via a countershaft side ball bearing, and an outer race of the countershaft side ball bearing is also fixed to the engine main body via said fixing plate, and the fixing plate is fixed to the engine main body by a bolt which is disposed further from an axis of the countershaft than an outer diameter part of a first speed driven gear which is mounted on the countershaft, the fixing plate is configured and dimensioned to cover less than half of the circumference of each of the respective outer races, an annular recess is provided on the outer race of the countershaft side ball bearing, and the fixing plate engages with the annular recess, and the fixing plate has two arcuate ends formed therein to conform to the respective shapes of the ball bearing races engaged thereby.

9. The motorcycle transmission according to claim 8, wherein part of the countershaft side ball bearing projects slightly from an inner face of a side wall of a crankcase, and the fixing plate engages with the annular recess provided on an outer periphery of a portion of the countershaft side ball bearing projecting from the side wall.

10. The motorcycle transmission according to claim 8, wherein the fixing plate is fixed to the engine main body by a single bolt.

11. The motorcycle transmission according to claim 8, wherein the transmission is disposed inside of a crankcase having a side wall with a support hole formed therein, and the outer race of the main shaft side ball bearing is fitted into said support hole provided in the side wall of the crankcase.

12. The motorcycle transmission according to claim 11, wherein a step is formed in the side wall of the crankcase at the bottom of said support hole, and wherein the outer race of the main shaft side ball bearing is held between said step and the fixing plate fixed to an inner face of the side wall by a single bolt engaging with an outer peripheral part of the outer race.

13. The motorcycle transmission according to claim 8, wherein the transmission further comprises a shift drum and a drive mechanism for selectively rotating the shift drum, said drive mechanism comprising:

an electric motor having a rotational axis in a plane perpendicular to an axis of the shift drum, a reduction gear mechanism driven by said electric motor, a barrel cam operatively connected to said reduction gear mechanism, a disk-shaped rotation transmission member, and a shaft extending between said rotation transmission member and said shift drum.

* * * * *